United States Patent
Rayudu (10) Patent No.: US 10,861,036 B2
(45) Date of Patent: Dec. 8, 2020

(54) SYSTEMS AND METHODS FOR RANDOMIZED REWARD DISTRIBUTION EXCHANGE FOR LOYALTY POINTS

(71) Applicant: Ranga Rayudu, Morgan Hill, CA (US)

(72) Inventor: Ranga Rayudu, Morgan Hill, CA (US)

(*) Notice: Subject to any disclaimer, the term of this patent is extended or adjusted under 35 U.S.C. 154(b) by 61 days.

(21) Appl. No.: 16/183,880

(22) Filed: Nov. 8, 2018

(65) Prior Publication Data

US 2019/0139068 A1    May 9, 2019

Related U.S. Application Data (60) Provisional application No. 62/583,198, filed on Nov. 8, 2017.

(51) Int. Cl.
  *G06Q 30/02*    (2012.01)
  *G06F 7/58*    (2006.01)
  *H04L 9/30*    (2006.01)
  *H04L 9/06*    (2006.01)

(52) U.S. Cl.
  CPC ......... *G06Q 30/0212* (2013.01); *G06F 7/588* (2013.01); *G06Q 30/0226* (2013.01); *H04L 9/0662* (2013.01); *H04L 9/30* (2013.01)

(58) Field of Classification Search
  CPC ............ G06Q 30/0212; G06Q 30/0226; G06F 7/588; H04L 9/0662; H04L 9/30
  See application file for complete search history.

(56) References Cited

U.S. PATENT DOCUMENTS

| | | | | |
|---|---|---|---|---|
| 5,611,729 | A * | 3/1997 | Schumacher | G07F 17/3211 463/18 |
| 2004/0030734 | A1* | 2/2004 | Wells | G06F 7/588 708/250 |
| 2004/0053668 | A1* | 3/2004 | Baerlocher | G07F 17/32 463/18 |
| 2009/0287579 | A1* | 11/2009 | Walker | G06Q 20/18 705/21 |
| 2010/0121896 | A1* | 5/2010 | Oram | H04L 9/0662 708/250 |
| 2013/0268342 | A1* | 10/2013 | Tune | G06Q 30/0207 705/14.29 |
| 2013/0346302 | A1* | 12/2013 | Purves | G06Q 20/108 705/40 |
| 2014/0012652 | A1* | 1/2014 | Levin | G06Q 30/0233 705/14.31 |

(Continued)

OTHER PUBLICATIONS

"About MyLotto Reward" (published on http://www.ohiolottery.com/MyLotto-Rewards/About-the-Program on Sep. 17, 2017 and retrieved using Internet Archive Wayback Machine on Oct. 22, 2020 ); (Year: 2017).*

*Primary Examiner* — James M Detweiler
(74) *Attorney, Agent, or Firm* — Chhabra Law Firm, PC (57) ABSTRACT

Systems and methods for randomized reward distribution exchange for loyalty points are disclosed. Exemplary implementations may: register, by a computer device, loyalty points associated with a user; obtain a user ticket number; use a random number generator, generate a winning ticket number; award a prize to a user when it is determined that at least one number from the first set matches at least one number from the second set; and notify the user to go through a prize redemption process to obtain the prize.

20 Claims, 5 Drawing Sheets

(56) References Cited

U.S. PATENT DOCUMENTS

2014/0115329 A1* 4/2014 Sturonas ............. G06F 21/6218
713/165
2015/0095648 A1* 4/2015 Nix ................... H04W 52/0216
713/170

* cited by examiner

SYSTEMS AND METHODS FOR RANDOMIZED REWARD DISTRIBUTION EXCHANGE FOR LOYALTY POINTS

CROSS REFERENCE TO RELATED APPLICATIONS

The present application claims priority from U.S. Provisional Patent Application No. 62/583,198, filed on Nov. 8, 2017, under 35 U.S.C. 119(e). The contents of the above mentioned provisional patent application is incorporated herein by reference for all purposes to the extent that such subject matter is not inconsistent herewith.

FIELD OF THE INVENTION

Embodiments of the present invention relates generally to distribution of loyalty points. More particularly, embodiments of the invention relate to systems and methods for randomized reward distribution exchange for loyalty points.

BACKGROUND OF THE INVENTION

There are a large number of user point reward systems, typically employed by companies to encourage behavior by employees or customers. These systems often offer reward in a linear exchange for points, that is, the greater the number of points awarded, the greater the award. However, the current systems have several drawbacks, including limiting the amount of reward that can be distributed. Since cost is directly proportional to the number of user points, there is significant cost to the entity issuing the reward if it wishes to entice more users to join or encourage existing users with larger rewards. Thus, there exists a significant need for techniques that overcome the above stated drawback(s).

SUMMARY OF THE DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for randomized reward distribution exchange for loyalty points, using a random number generator function, including registering, by a computer device, loyalty points associated with a user. The method also includes obtaining a user ticket number, where the user ticket number can be selected by the user to enter into a random reward distribution based system. The user ticket number can include a set of at least one of real numbers alpha-numeric numbers. The method also includes using the random number generator function, generating a winning ticket number, where the winning ticket number includes a second set of at least one of real numbers or alpha-numeric numbers. The method also includes awarding a prize to a user when it is determined that at least one number from the first set matches at least one number from the second set. The method also includes notifying the user to go through a prize redemption process to obtain the prize, where the notification is sent when either automatically by the system or when the user opens a ticket profile associated with an account of the user, and selects the user ticket number including the at least one number. Other embodiments of this aspect include corresponding computer systems, apparatus, and computer programs recorded on one or more computer storage devices, each configured to perform the actions of the methods.

Implementations may include one or more of the following features. The method can include that the loyalty points are accumulated from at least one external source, and where the loyalty points from the at least one external source are converted into standardized points. The method can further include that the user ticket number is provided in exchange for a number of standardized points. The method can include provisions to assist the user to either manually create the user ticket number or let the system auto-generate the user ticket number using the random number generator function. The method can also include that the user ticket number has a predetermined length determined based on a predefined rule. The method can include where the user ticket number includes a first set of at least one of real numbers or alpha-numeric numbers.

In one particular implementation, the method includes transferring the loyalty points of the user to the computer device in a JSON (JavaScript Object Notation) encoded object using an openssl encryption method (a toolkit for the Transport Layer Security (TLS) and Secure Sockets Layer (SSL) protocols) with a public key given to the external source, previously wrapped up in a base64_encode( ) function, and where the public key is generated using an algorithmic function: openssl rsa—in private.key—out public.key, where the private.key is 2048 bits and is generated using an algorithmic function: Implementations of the described techniques may include hardware, a method or process, or computer software on a computer-accessible medium.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Disclosed herein is a novel method for distribution of rewards associated with accumulated user points. Points are registered on a central server through conversion of points accumulated from an external source (such as loyalty points from airlines, hotels, dining, etc.) to a single, standardized central server points. They may also be registered through internal electronic action by the user (e.g. clicking on a link or article, completing a survey, posting on social media) at the central server.

Methods and systems disclosed herein allows for the user to receive increased numbers of points and for companies to offer increased reward by offering a unified random reward distribution based system (e.g., sweepstakes). Assigning rewards in exchange for user points in a random manner allows for the distribution of cost of each reward and improves user interaction by allowing greater numbers of points to be distributed. Another advantage of a unified random reward distribution based system is user and system efficiency since such systems and methods allow multiple brands to offer their random reward distribution based system at a unified single location thereby reducing the need for multiple systems/servers each running their own sweepstakes program.

One aspect of the present disclosure relates to a system configured for randomized reward distribution exchange for loyalty points. The system may include one or more hardware processors configured by machine-readable instructions. The processor(s) may be configured to register, by a computer device, loyalty points associated with a user. The loyalty points may be accumulated from an external source. The loyalty points for all external sources may be converted into standardized points. The processor(s) may be configured to obtain a user ticket number. The user ticket number selected by the user to enter into a random reward distribution based system (e.g., sweepstakes). The user can either manually create the user ticket number or let the system auto-generate the user ticket number. The user ticket number may have a predetermined length determined based on a predefined rule. The user ticket number may be provided in exchange for a number of standardized points. The user ticket number may include a first set of at least one of real numbers or alpha-numeric numbers. The processor(s) may be configured to use a random number generator, generate a winning ticket number, the winning number including a second set of at least one of real numbers or alpha-numeric number. The processor(s) may be configured to award a prize to a user when it is determined that at least one number from the first set matches at least one number from the second set. The processor(s) may be configured to notify the user to go through a prize redemption process to obtain the prize. The notification may be sent when either automatically by the system or when the user opens a ticket profile associated with an account of the user, and selects the user ticket number including the at least one number.

Another aspect of the present disclosure relates to a method for randomized reward distribution exchange for loyalty points. The method may include registering, by a computer device, loyalty points associated with a user. The loyalty points may be accumulated from an external source. The loyalty points for all external sources may be converted into standardized points. The method may include obtaining a user ticket number. The user ticket number selected by the user to enter into a sweepstakes. The user can either manually create the user ticket number or let the system auto-generate the user ticket number. The user ticket number may have a predetermined length determined based on a predefined rule. The user ticket number may be provided in exchange for a number of standardized points. The user ticket number may include a first set of at least one of real numbers or alpha-numeric numbers. The method may include using a random number generator, generating a winning ticket number, the winning number including a second set of at least one of real numbers or alpha-numeric number. The method may include awarding a prize to a user when it is determined that at least one number from the first set matches at least one number from the second set. The method may include notifying the user to go through a prize redemption process to obtain the prize. The notification may be sent when either automatically by the system or when the user opens a ticket profile associated with an account of the user, and selects the user ticket number including the at least one number.

Yet another aspect of the present disclosure relates to a non-transient computer-readable storage medium having instructions embodied thereon, the instructions being executable by one or more processors to perform a method for randomized reward distribution exchange for loyalty points. The method may include registering, by a computer device, loyalty points associated with a user. The loyalty points may be accumulated from an external source. The loyalty points for all external sources may be converted into standardized points. The method may include obtaining a user ticket number. The user ticket number selected by the user to enter into a sweepstakes. The user can either manually create the user ticket number or let the system auto-generate the user ticket number. The user ticket number may have a predetermined length determined based on a predefined rule. The user ticket number may be provided in exchange for a number of standardized points. The user ticket number may include a first set of at least one of real numbers or alpha-numeric numbers. The method may include using a random number generator, generating a winning ticket number, the winning number including a second set of at least one of real numbers or alpha-numeric number. The method may include awarding a prize to a user when it is determined that at least one number from the first set matches at least one number from the second set. The method may include notifying the user to go through a prize redemption process to obtain the prize. The notification may be sent when either automatically by the system or when the user opens a ticket profile associated with an account of the user, and selects the user ticket number including the at least one number.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

Figure 1:
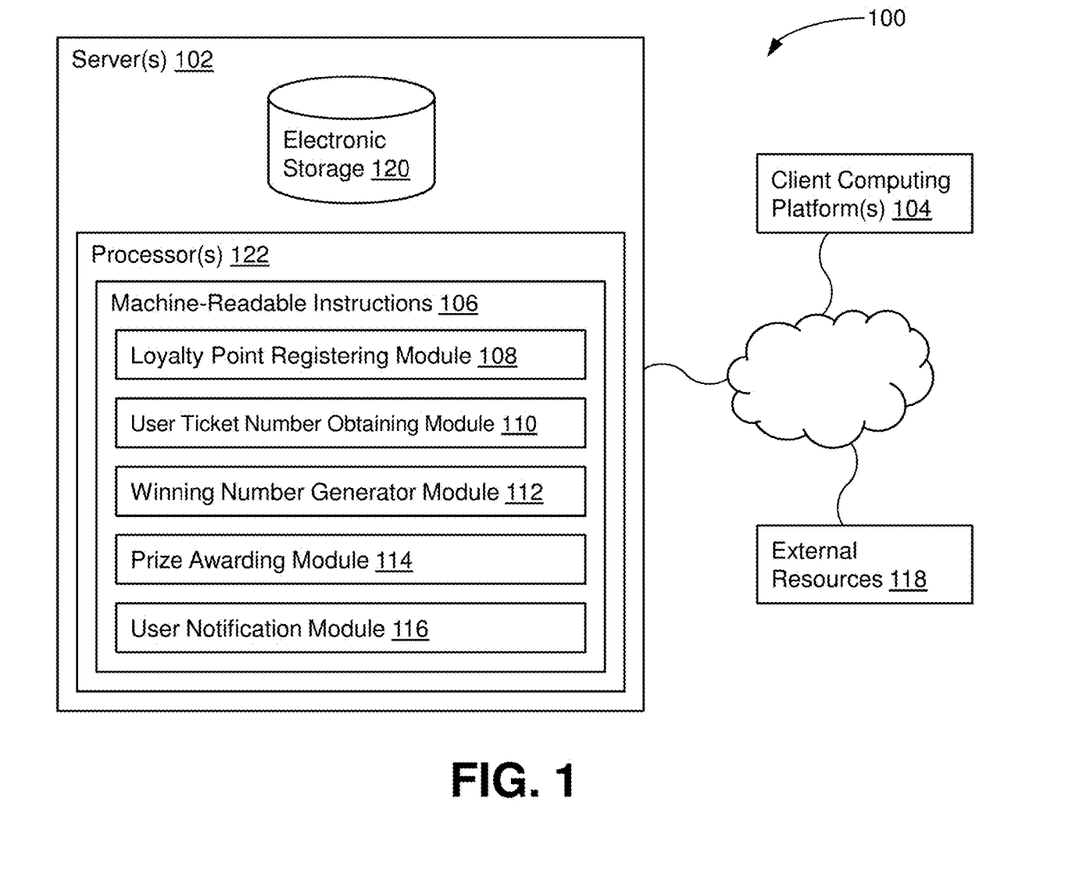
FIG. 1 illustrates a system configured for randomized reward distribution exchange for loyalty points, in accordance with one embodiment.

FIG. 1 illustrates a system 100 configured for randomized reward distribution exchange for loyalty points, in accordance with one embodiment. In some implementations, system 100 may include one or more servers 102. Server(s) 102 (also referred to herein as central server) may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of a loyalty point registering module 108, a user ticket number obtaining module 110, a number generator using module 112, a prize awarding module 114, a user notification module 116, and/or other instruction modules.

Loyalty point registering module 108 of central server 102 may be configured to register, by a computer device, loyalty points associated with a user. The loyalty points can further be registered through an internal electronic action by a user. The loyalty points may be accumulated from an external source. By way of non-limiting example, the external source may include at least one of an airline, hotel, restaurant, brand, or any other loyalty program that encourages a user to use a product or service provided by a brand (e.g., points awarded to a computer game player during gameplay). The loyalty points for all external sources may be converted into standardized points. The brand may include a name given to a product or service, according to some implementations. Examples of the brand may include one or more of label, and/or other brands.

In one embodiment, the user begins the point transfer process by interfacing with the external loyalty server, usually through a web interface (e.g., Loyalty Partner HTML or XML document/document object model). Loyalty point registering module 108 can be configured to receive a data object that contains the user's loyalty ID, the number of points intended for transfer between the external server and the central server, and the unique client ID (and possibly other identification information about the user including email address, phone number, status). The user can log into external loyalty server and corresponding front-end client website (client external loyalty website and server). The data is parsed to module 108 through web protocol, usually generating a callback to confirmation that the data has been received. Each user can have a Loyalty ID (Identification) associated with loyalty partners (e.g., businesses associated with external loyalty server(s). The Loyalty ID can be registered on central server 102 by associating the loyalty ID with the main application user ID at module 108. In one embodiment, a loyalty partner server (third-party external server) is identified at central server by having a partner database which can be created by the main application administrator. Each partner can have a unique identifier to identify each loyalty partner.

In one embodiment, points are assigned at central server by a POST request must be made to the endpoint URL or API with the following requirements:

A parameter "points_data" can be created as an encrypted JSON encoded data object using OpenSSL encryption method with a provided public key given to the third-party (external loyalty server) in a base64_encode( ) function for a safe transfer over the HTTP protocol. In one embodiment the public key is previously provided to external loyalty server. In one embodiment, the points_data object can be provided with the following properties:

amount: The amount of points user is entitled—this value is entered by the user;

loyalty_id: The Loyalty ID is usually related to the logged in user on the third-party server;

A parameter "partner_id" which is given to each loyalty partner so it can be detected on central server 102. The following method is expected. In one embodiment, central server 102 expects to receive the encrypted JSON object in the form:

openssl_public_encrypt($data, $encrypted, $publicKey, OPENSSL_PKCS1_OAEP_PADDING);

For each external loyalty server a pair of public and private keys are generated manually using the OpenSSL encryption method. As a non-limiting example the key pairs can be generated as:

openssl genpkey—algorithm RSA—out private.key—pkeyopt rsa_keygen_bits:2048//private key generation;

openssl rsa—pubout—in private.key—out public.key//public key generation

In one embodiment, the private key can be stored outside the root on central server 102 while the public key is given to client 104 (or external loyalty server) so the point transfer requests made from the third-party can be a trusted and secured one. In another embodiment, client 104 receives the public key from the external loyalty partner server.

The created object can, in one embodiment, be encrypted (for example using SSL(Secure Socket Layer) encryption method). Thus, client 104 (or external loyalty server) and central server 102 both have a pair of public/private keys that authenticates the addition of points to the user's account within the main web application. In one embodiment, data transfer occurs as the encrypted object is sent as a POST request to the central server loyalty point transfer module. In one embodiment, this module can occur in the form of a REST (Representational State Transfer) API (Application Program Interface).

In one embodiment, central server 102 can receive point data information from external loyalty partners implementing their respective loyalty programs. In this embodiment, when the points data object is created in relation to the existing client loyalty point database, the corresponding number of points are deducted on the external client server. In another embodiment, external loyalty partners can directly offer a loyalty program to its clients utilizing central server 102. In this embodiment, since no external loyalty point data exists on the external servers of loyalty partners, no external loyalty points exist that can or need to be deducted.

Once the central server receives the data, the user account database is updated to ensure that the loyalty points are added to the appropriate user account, noting the origin of the points, as determined by the unique client ID.

When a request is submitted for point transfer from a client web application (e.g. third-party site), the user is redirected to main application user interface. If the User is already logged in to the main application managed by the central server, the client's "partner_id" is checked for validity. If so, the central server attempts to decrypt the "points_data" object by using the private encryption key which was generated uniquely for the client claiming to make the request. As a non-limiting example this can be achieved through the following function:

openssl_private_decrypt(base64_decode($data), $decrypted, $privateKey, OPENSSL_PKCS1_OAEP_PADDING);

If the decryption fails, the user will receive an error notification, and a callback will be made to the external server indicating the transfer process has failed. However, if the data is successfully decrypted, the Loyalty ID will be checked to ensure the logged-in user has the loyalty ID associated with the partner which is claiming to make the request. If so, the loyalty points are then associated with the user within the database. In another embodiment, the user's loyalty ID may be assigned to the user within the central server database at the time of first deposit from the external server, if the external server unique partner ID is verified.

In another embodiment, central server 102 can request the data object (number of points to be deducted from external server, user loyalty ID) from the external server through web protocols. These protocols (e.g. basic auth/Oauth 2) may initially require verification of each servers' identity to the other. In this embodiment, the user may remain within the user interface with the main web application. In yet another embodiment, the user may complete tasks within the main user application (e.g. shopping, clicking on links) and then be assigned standardized points directly.

After the transfer event occurs and is recorded in the database, loyalty points registering module 108 can convert the points into standardized points. In one embodiment, each transfer event (of loyalty points) is translated to final standardized points. The process occurs by the following function:

$$cx = y$$

Where x is the number of points transferred from the original server, c is the conversion multiplier (CM) assigned to each client or external server, and y is the value of the standardized points. The final amount of points available on central server 102 can differ from the original claimed amount as every loyalty partner has conversion multiplier function which converts the original passed values into standardized points.

Residing on central server 102 is database 120 that associates each client with a conversion multiplier. This multiplier can have a range of values that associates each partner's loyalty points into standardized points. In one embodiment, the CM can have a value between 0.001-1000. The CM can be updated and maintained by the application administrator. The number of points from the external server are multiplied by this conversion multiplier to obtain the number of standardized points deposited. These points are then added to the user account. The standardized points are then utilized/converted to create tickets by the user (or by the system on behalf of the user), as further described herein.

In one embodiment, after the user's loyalty points are converted into standardized points, client 104 is redirected to the interface with central server 102 through the main application user interface (main application user HTML/XML document or document object model.) In one embodiment, the results of the deposit process are displayed, confirming the receipt of original loyalty points by central server 102. In one embodiment, the results of the standardization process are also displayed, showing the user how many standardized points they received in exchange for their deposit of original loyalty points.

A user ticket number (also referred to herein as user ticket number set) may have a predetermined length determined based on a predefined rule. The user ticket number can include a set of real or alphanumeric numbers. The user ticket number may be provided in exchange for a number of standardized points. Conversion to the standardized points may be determined based on a brand conversion rate related to each external source. The brand conversion rate may be separately negotiated with the external source. The user ticket number may include a first set of at least one of real numbers or alpha-numeric numbers. The first set of each user ticket number may include a combination of 3, 4, 5, 6, 7, 8, or 9 two digit numbers. A given real number may be a complex number. The real number may include any rational or irrational number, according to some implementations. Examples of the real number may include one or more of irrational number, rational number, scalar product, and/or other real numbers.

In one embodiment, the user can create a sweepstakes entry by exchanging a number of standardized points (e.g., value 0.01-100000) for a user ticket number. Each entry can comprise of a set of chosen numbers, typically 3-10 numbers, each with a value between 1-100. The user ticket numbers can be created by the user or automatically by the system on behalf of the user. When the user ticket number is created by a user, system 102 displays to the user (e.g., via a user web application document object model) all the available numbers. In one embodiment, the available numbers can be listed in ascending order. Here, the user can then select enough of the numbers to self generate a ticket.

In another embodiment, system 102 can generate the ticket number on behalf of the user. In this embodiment, the user is display a set of numbers autogenerated by a random number generator function of server 102. In yet another embodiment an application or script residing on client 104 application can generate the random number sequences.

Once the number set is chosen, two conditions must be met. First, the user should have enough standardized points within their account to create and ticket. Second, the chosen ticket set should not already exist for that user account for the same draw time. If both conditions are met, and the user confirms their selection, user ticket obtaining module 110 creates and associates the ticket with the user account. User ticket number obtaining module 110 may be configured to obtain a user ticket number for the user. A minimum number of standardized points may be necessary to create the user ticket number. The minimum number can be between 1 and 10000. The user ticket number selected by the user is used as an entry to enter into a random reward distribution system (e.g., sweepstakes). The user can either manually create the user ticket number or let the system auto-generate the user ticket number. The sweepstakes may be a lottery. The sweepstakes may include a lottery in which the prize consists of the money paid by the participants, according to some implementations. The sweepstakes may also be part of a contest, or test of skill, if additional tests are required to obtain a prize.

The ticket number can then be associated with the user's account as well as the next "draw" time. In one embodiment, the "draw" time is previously configured by the administrator on the central server.

Winning number generator module 112 may be configured to use a random number generator function to generate a winning ticket number. The winning number can include a second set of at least one of real numbers or alpha-numeric numbers. The second set of the winning ticket number may include a combination of 3, 4, 5, 6, 7, 8, or 9 two digit numbers. The random number generator may be a routine. The random number generator function may include a routine designed to yield a random number, according to some implementations. In one embodiment, winning number generator module 112 may accept a number generated by an external verified source that has been known to be random (e.g. numbers from a lottery drawing, etc.) to generate, at least in part, the winning ticket number.

The winning number set has the same number of unique numbers as the tickets used to enter the drawing. In one embodiment, winning numbers are either created through a random number function, manually by the main application administrator, or a combination thereof.

In yet another embodiment, the random winning number draw can employ an external large physical device such as a "bingo blower." These machines and other similar physical random number generators utilize entropy by allowing ball scattered at random by air blowers to rise to the top, where they are hand-picked out of their container by an individual assigned to obtain the random winning number set. In yet another embodiment, an electronic true random number generator is used.

Prize awarding module 114 may be configured to award a prize to a user when it is determined that at least one number from the first set matches at least one number from the second set, the first and second sets, as described above. A prize may be distributed in such an order that a greater value is associated with the prize when a higher winning number combinations are included in the at least one number. A maximum total number of available tickets to the user can be determined by dividing the standardized points available to the user by minimum number of points that may be necessary to create a ticket. A limit can be imposed as to the number of maximum total number of available tickets to the user that can be utilized in a single time period. The number of maximum total number of available tickets to the user that can be utilized in a single time period cannot be greater than a predefined numerical value. The prize may be a gift. The prize may include something given for victory or superiority in a contest or competition or for winning a lottery, according to some implementations. Examples of the prize may include one or more of door prize, fellowship, gratuity, jackpot, premium, prize money, scholarship, and/or other prizes.

By way of non-limiting example, the time period can be at least one of an hour, a fraction of an hour, a plurality of hours, a day, a plurality of days, or a combination thereof. The hour may be a time unit. The hour may include a period of time equal to 1/24th of a day, according to some implementations. Examples of the hour may include one or more of man hour, sidereal hour, and/or other hours. Similarly, the predefined numerical value (the maximum number of tickets available to a user during the time period) may be any value between 1 and 1000.

In one embodiment, prize awarding module 114 can match each user ticket number against a set of winning numbers. At the previously specified time (the "Draw" time), the central server executes the ticket matching module. Here, a set intersection function is performed on all user ticket numbers created for every user since the time of the previous draw. In one embodiment, the set intersection evaluates each set of numbers in the ticket entries against the numbers contained in the winning number set. Each ticket is then assigned a prize level based on how many numbers within the ticket set match the numbers within the winning number set as illustrated in FIG. 3.

Figure 3:
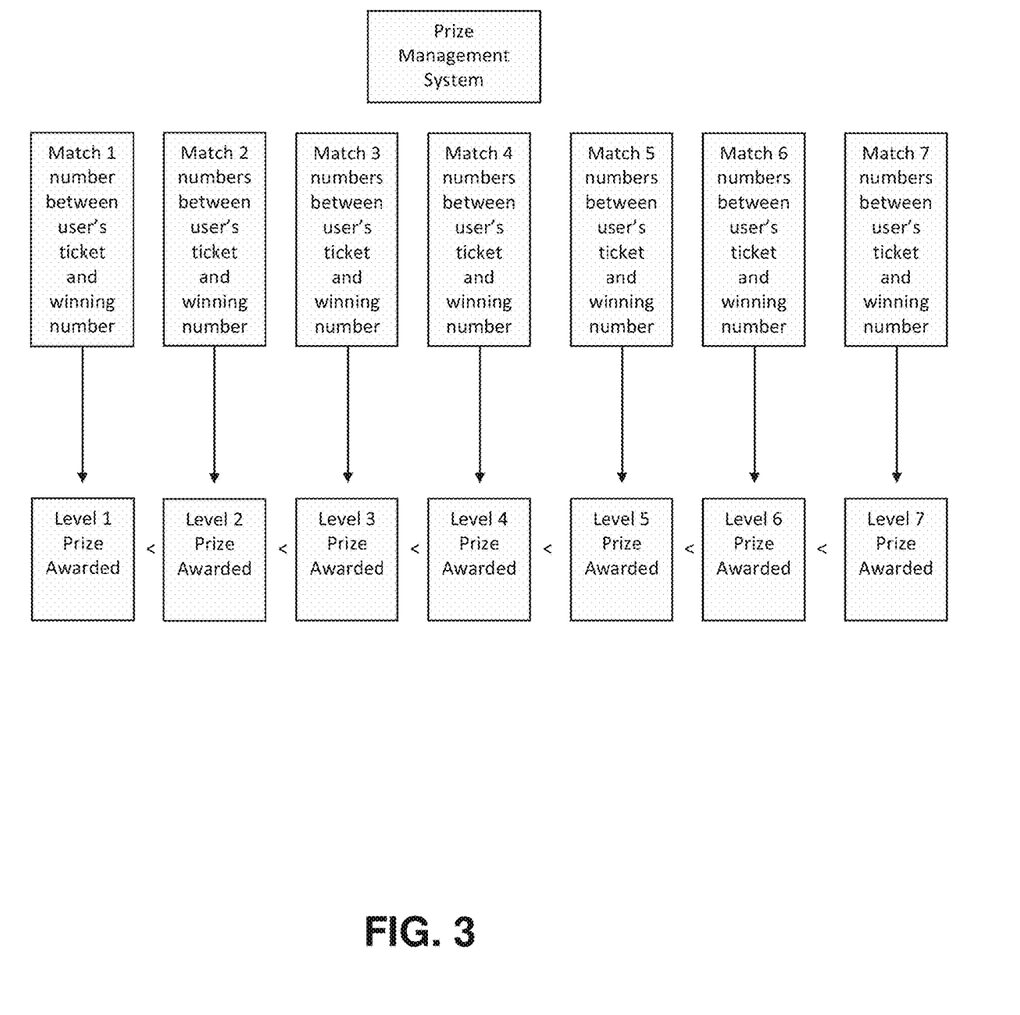
FIG. 3 illustrates a prize management system, in accordance with one embodiment.

As illustrated in FIG. 3, if each ticket contains seven unique numbers, a winning number set is entered with seven unique numbers. Each number that exists in both sets is considered a winning match. In yet another embodiment, system 102 can employ graphical images (e.g., pictures) instead of numbers as sets of data to be matched against other sets.

User notification module 116 may be configured to notify the user to go through a prize redemption process to obtain the prize. By way of non-limiting example, the notification may be sent when either automatically by the system or when the user opens a ticket profile associated with an account of the user, and selects the user ticket number including the at least one number. A prize may also include awarding standardized points to the user and adding the standardized points to the account of the user.

After the ticket matching process, the user is presented with an option to redeem any ticket that has matched anywhere from zero to all numbers in the number set. The system allows the user to identify how many numbers are matched in each ticket, and associates a reward or prize with each of those matches. Rewards/prizes may take the form of standardized points, original loyalty points, monetary compensation, gift cards, cryptocurrency, or any other prize form.

In one embodiment, each winning ticket can be associated with a button that allows the user to claim a prize associated that ticket. Once the "claim" button has been selected, central server 102 displays to the user all available prizes within that category. The user selects the prize of their choice and receives a display of confirmation that their choice was submitted to the central server database. Each ticket may only be redeemed for a single prize. Therefore, once a prize is claimed, the ticket is changed to an inactive status. Central server 102 then displays which prizes are awarded each user in administrator user interface, usually when queried.

In some implementations, by way of non-limiting example, the internal electronic action may include at least one of a click on a web link, completion of a survey, or posting on social media. In some implementations, the numbers can be real numbers or alpha-numeric numbers. The survey may be an examination. The survey may include a detailed critical inspection, according to some implementations. Examples of the survey may include one or more of resurvey, and/or other surveys.

In one embodiment, central server 102 comprises a user status module that evaluates and updates a user's status level. This module assigns a user a status based on criteria set by the administrator for each level. These criteria may include number of loyalty points transferred, number of standardized points logged, number of tickets created, number of prizes awarded, participating in a survey, posting on social media, etc. One or more of these criteria may be used to increase or decrease the user status. User status can be updated on a regular predetermined interval. In another embodiment, a test of skill may be instituted before a matched ticket is claimed. Such a test may ask the user a trivia question or ask the user to complete a task to test that skill. If the test is successfully completed, the user may be allowed to use the ticket to select a prize. If the test is failed, the user is directed back to the matched tickets page. In another embodiment, the user may choose to automate several functions, such as choosing tickets, checking for matched tickets, and selecting prizes.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information outside of system 100, external entities participating with system 100, and/or other resources. In some implementations, some or all of the functionality attributed herein to external resources 118 may be provided by resources included in system 100.

Server(s) 102 may include electronic storage 120, one or more processors 122, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise non-transitory storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, 116, and/or other modules. Processor(s) 122 may be configured to execute modules 108, 110, 112, 114, 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Figure 2:
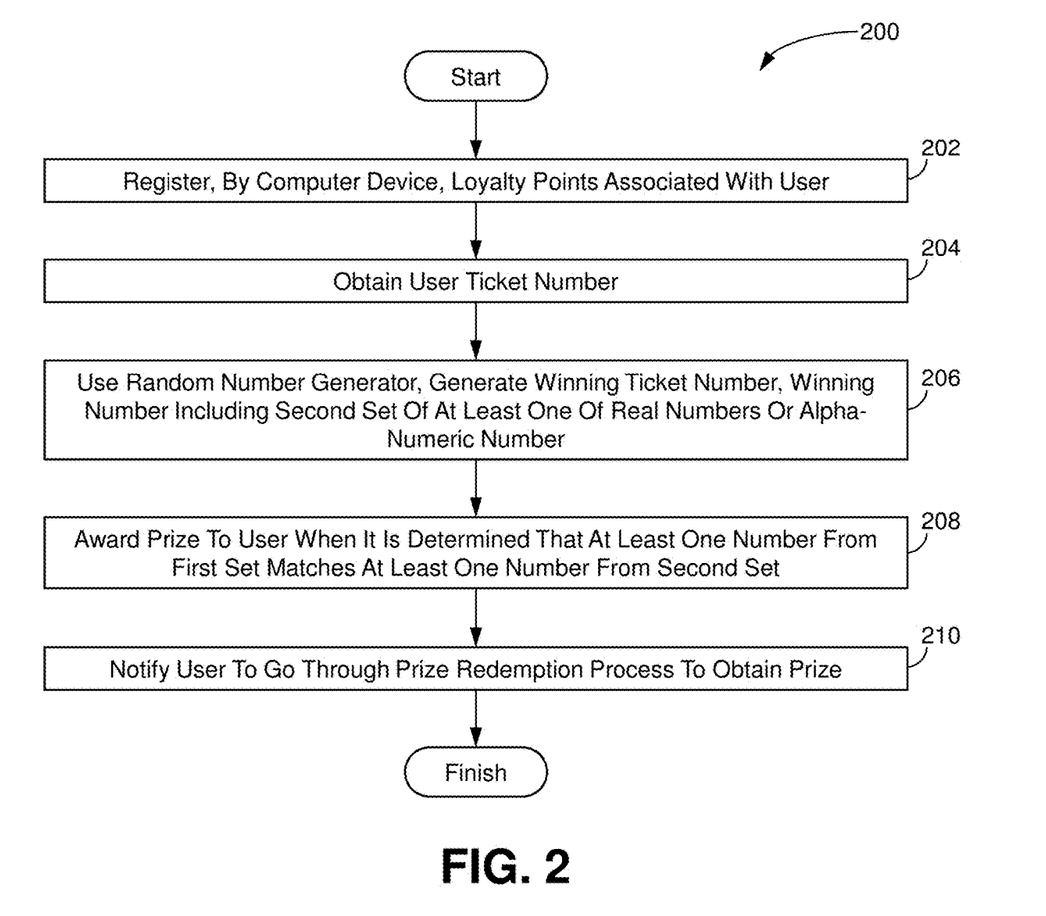
FIG. 2 illustrates a method for randomized reward distribution exchange for loyalty points, in accordance with one embodiment.

FIG. 2 illustrates a method 200 for randomized reward distribution exchange for loyalty points (e.g., sweepstakes), in accordance with one embodiment. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include registering, by a computer device, loyalty points associated with a user. The loyalty points may be accumulated from an external source. The loyalty points for all external sources may be converted into standardized points. Operation 202 may be performed by one or more hardware processors configured by machine-readable instructions including a module that is the same as or similar to loyalty point registering module 108, in accordance with one embodiment.

An operation 204 may include obtaining a user ticket number. The user ticket number selected by the user to enter into a sweepstakes. The user can either manually create the user ticket number or let the system auto-generate the user ticket number. The user ticket number may have a predetermined length determined based on a predefined rule. The user ticket number may be provided in exchange for a number of standardized points. The user ticket number may include a first set of at least one of real numbers or alpha-numeric numbers. Operation 204 may be performed by one or more hardware processors configured by machine-readable instructions including a module that is the same as or similar to user ticket number obtaining module 110, in accordance with one embodiment.

An operation 206 may include using a random number generator, generating a winning ticket number, the winning number including a second set of at least one of real numbers or alpha-numeric number. Operation 206 may be performed by one or more hardware processors configured by machine-readable instructions including a module that is the same as or similar to number generator using module 112, in accordance with one embodiment. As a non-limiting example, random number generator can generate a winning ticket number by selecting a random number between 0 and 1. Thereafter, the random generator number can at least one of multiply or divide the generated number by another random number generator. In one embodiment, a sequence of numbers are then selected from the final result depending on the configured length of the first and second set of numbers (e.g., 3, 4, 5, 6, 7, 8, or 9 two digit numbers). In this embodiment, the decimal point from the final result is ignored.

An operation 208 may include awarding a prize to a user when it is determined that at least one number from the first set matches at least one number from the second set. Operation 208 may be performed by one or more hardware processors configured by machine-readable instructions including a module that is the same as or similar to prize awarding module 114, in accordance with one embodiment.

An operation 210 may include notifying the user to go through a prize redemption process to obtain the prize. The notification may be sent when either automatically by the system or when the user opens a ticket profile associated with an account of the user, and selects the user ticket number including the at least one number. Operation 210 may be performed by one or more hardware processors configured by machine-readable instructions including a module that is the same as or similar to user notification module 116, in accordance with one embodiment.

Figure 4:
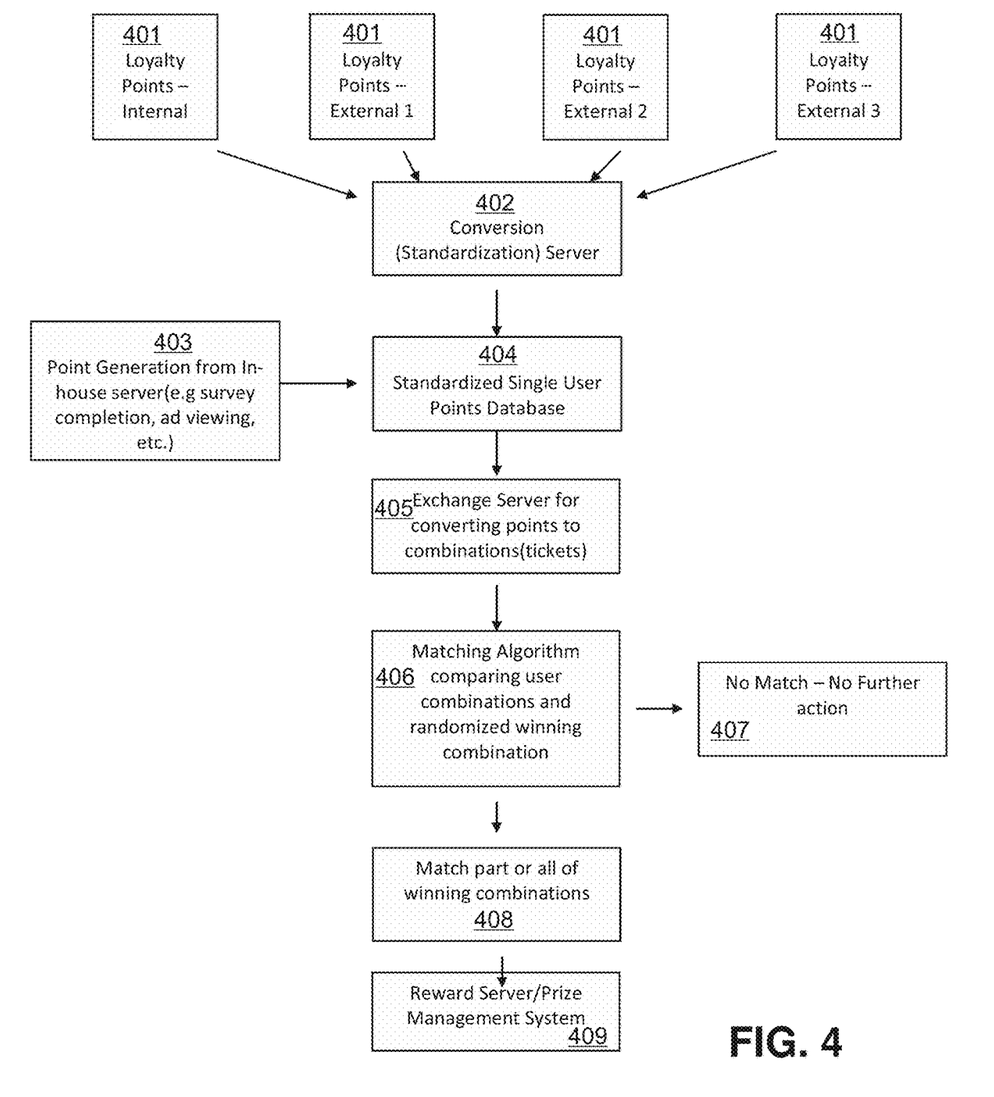
FIG. 4 illustrates a block diagram of a flow process related to randomized reward distribution exchange for loyalty points, in accordance with one embodiment.

FIG. 4 illustrates a block diagram of a flow process related to randomized reward distribution exchange for loyalty points, in accordance with one embodiment. As illustrated, at 401, loyalty points can be received from a number of sources (both internal and external/partner sources). Thereafter, at 402 the loyalty points are converted to standardized points. At 403, standardized points can optionally also be generated by server 102 based on activities performed by the user (e.g., survey completion, advertisement viewing, etc.). At 404 the standardized points are accumulated for each user and stored in database 120. At 405, the standardized points can be exchanged to generate user ticket numbers. At 406, a matching algorithm compares the user ticket numbers to a randomized winning number(s). At 407, is there is no match, no action is taken. However, if there is a match then at 408 all the winning combination numbers are determined. At 409, the reward server or prize management system awards the user based on the winning combinations.

Figure 5:
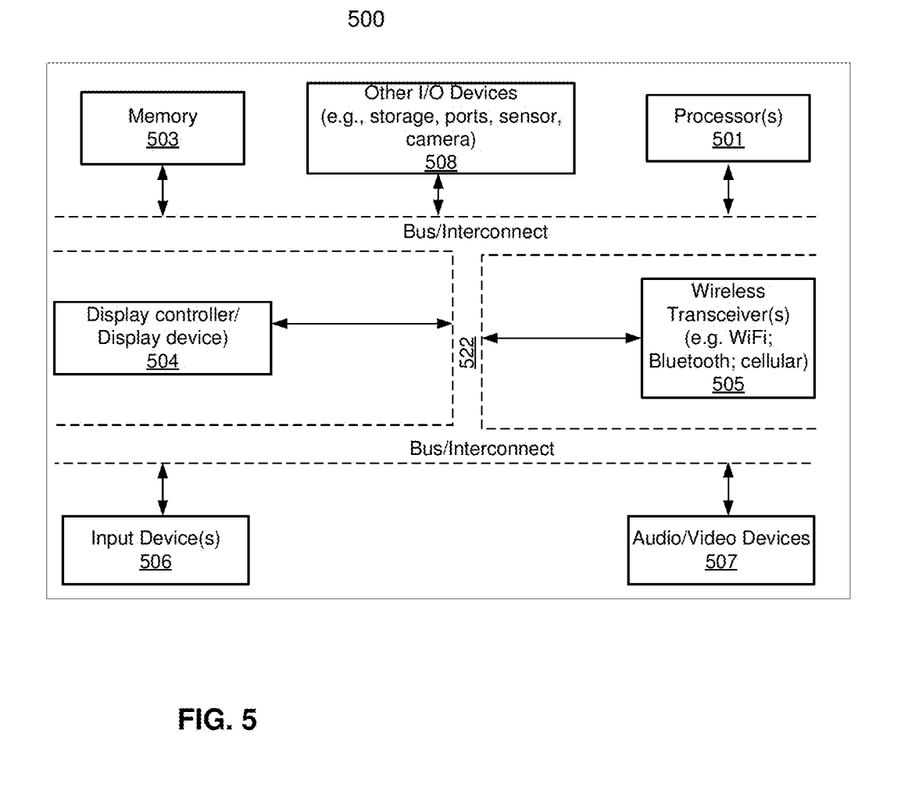
FIG. 5 is a block diagram illustrating a data processing system such as a computing system which may be used with one embodiment of the invention.

FIG. 5 is a block diagram illustrating a data processing system such as a computing system 500 which may be used with one embodiment of the invention. For example, system 500 can be implemented as part of a central server 102, external loyalty server, and/or client machine 104. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

System 500 can have a distributed architecture having a plurality of nodes coupled through a network, or all of its components may be integrated into a single unit. Computing system 500 can represent any of the data processing systems described above performing any of the processes or methods described above. In one embodiment, computer system 500 can be implemented as integrated circuits (ICs), discrete electronic devices, modules adapted to a circuit board such as a motherboard, an add-in card of the computer system, and/or as components that can be incorporated within a chassis/case of any computing device. System 500 is intended to show a high level view of many components of any data processing unit or computer system. However, it is to be understood that additional or fewer components may be present in certain implementations and furthermore, different arrangement of the components shown may occur in other implementations. System 500 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 500 includes processor 501, memory 503, and devices 505-508 via a bus or an interconnect 522. Processor 501 can represent a single processor or multiple processors with a single processor core or multiple processor cores included therein. Processor 501 can represent one or more general-purpose processors such as a microprocessor, a central processing unit (CPU), Micro Controller Unit (MCU), etc. Processor 501 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions. Processor 501, can also be a low power multi-core processor socket such as an ultra low voltage processor, may act as a main processing unit and central hub for communication with the various components of the system. Such processor can be implemented as a system on chip (SoC).

Processor 501 is configured to execute instructions for performing the operations and methods discussed herein. System 500 further includes a graphics interface that communicates with graphics subsystem 504, which may include a display controller and/or a display device. Processor 501 can communicate with memory 503, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 503 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 503 may store information including sequences of executable program instructions that are executed by processor 501, or any other device. System 500 can further include IO devices such as devices 505-508, including wireless transceiver(s) 505, input device(s) 506, audio IO device(s) 507, and other IO devices 508.

Wireless transceiver 505 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 506 can include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). Other optional devices 508 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 508 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 522 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, in one embodiment, a mass storage (not shown) may also couple to processor 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method for randomized reward distribution exchange for loyalty points, using a random number generator function, comprising:
   registering, by a computer device, loyalty points associated with a user;
   receiving the loyalty points in a JSON encoded object using an OpenSSL encryption method with a public key given to an external source, previously wrapped up in a base64_encode( ) function;
   obtaining a user ticket number, wherein the user ticket number includes a first set of real or alphanumeric numbers selected by the user to enter into a random reward distribution based system;
   using the random number generator function, generating a winning ticket number, wherein the winning ticket number includes a second set of at least one of real or alpha-numeric numbers;
   awarding a prize to a user when it is determined that at least one number from the first set matches at least one number from the second set; and
   notifying the user to go through a prize redemption process to obtain the prize, wherein the notification is sent by at least one of automatically by the system or when the user opens a ticket profile associated with an account of the user and selects the user ticket number including the at least one number.

2. The method of claim 1, wherein the loyalty points are accumulated from at least one external source, and wherein the loyalty points from the at least one external source are converted into standardized points.

3. The method of claim 1, wherein the user ticket number is provided in exchange for a number of standardized points.

4. The method of claim 1, wherein the user can at least one of manually create the user ticket number or lets the system auto-generate the user ticket number using the random number generator function.

5. The method of claim 1, wherein the user ticket number has a predetermined length determined based on a predefined rule.

6. The method of claim 1, wherein the user ticket number includes a first set of at least one of real numbers or alpha-numeric numbers.

7. The method of claim 1, wherein the public key is generated using an algorithmic function:
openssl rsa—in private.key—out public.key,
wherein the private.key is 2048 bits and is generated using an algorithmic function:
openssl genpkey—algorithm RSA—out private.key rsa_keygen_bits:2048.

8. A non-transitory computer readable medium comprising instructions which when executed by a processing system can execute a method for randomized reward distribution exchange for loyalty points, using a random number generator function, the method comprising:
registering loyalty points associated with a user;
receiving the loyalty points in a JSON encoded object using an OpenSSL encryption method with a public key given to an external source, previously wrapped up in a base64_encode( ) function;
obtaining a user ticket number, wherein the user ticket number includes a first set of real or alphanumeric numbers selected by the user to enter into a random reward distribution based system;
using the random number generator function, generating a winning ticket number, wherein the winning ticket number includes a second set of at least one of real or alpha-numeric numbers;
awarding a prize to a user when it is determined that at least one number from the first set matches at least one number from the second set; and
notifying the user to go through a prize redemption process to obtain the prize, wherein the notification is sent by at least one of automatically by the system or when the user opens a ticket profile associated with an account of the user, and selects the user ticket number including the at least one number.

9. The non-transitory computer readable medium of claim 8, wherein the loyalty points are accumulated from at least one external source, and wherein the loyalty points from the at least one external source are converted into standardized points.

10. The non-transitory computer readable medium of claim 8, wherein the user ticket number is provided in exchange for a number of standardized points.

11. The non-transitory computer readable medium of claim 8, wherein the user can at least one of manually create the user ticket number or lets the system auto-generate the user ticket number using the random number generator function.

12. The non-transitory computer readable medium of claim 8, wherein the user ticket number has a predetermined length determined based on a predefined rule.

13. The non-transitory computer readable medium of claim 8, wherein the user ticket number includes a first set of at least one of real numbers or alpha-numeric numbers.

14. The non-transitory computer readable medium of claim 8, wherein the public key is generated using an algorithmic function:
openssl rsa—in private.key—out public.key,
wherein the private.key is 2048 bits and is generated using an algorithmic function:
openssl genpkey—algorithm RSA—out private.key rsa_keygen_bits:2048.

15. A system for randomized reward distribution exchange for loyalty points, comprising:
a memory device;
a processing system comprising at least one hardware core coupled to the memory device, wherein the processing device is configured to:
register loyalty points associated with a user;
receive the loyalty points in a JSON encoded object using an OpenSSL encryption method with a public key given to an external source, previously wrapped up in a base64_encode( ) function;
obtain a user ticket number, wherein the user ticket number includes a first set of real or alphanumeric numbers selected by the user to enter into a random reward distribution based system;
using the random number generator function, generate a winning ticket number, wherein the winning ticket number includes a second set of at least one of real or alpha-numeric numbers;
award a prize to a user when it is determined that at least one number from the first set matches at least one number from the second set; and
notify the user to go through a prize redemption process to obtain the prize, wherein the notification is sent by at least one of automatically by the system or when the user opens a ticket profile associated with an account of the user and selects the user ticket number including the at least one number.

16. The system of claim 15, wherein the loyalty points are accumulated from at least one external source, and wherein the loyalty points from the at least one external source are converted into standardized points.

17. The system of claim 15, wherein the user ticket number is provided in exchange for a number of standardized points.

18. The system of claim 15, wherein the user can at least one of manually create the user ticket number or lets the system auto-generate the user ticket number using the random number generator function.

19. The system of claim 15, wherein the user ticket number has a predetermined length determined based on a predefined rule.

20. The system of claim 15, wherein the user ticket number includes a first set of at least one of real numbers or alpha-numeric numbers, and wherein the public key is generated using an algorithmic function:
openssl rsa—in private.key—out public.key,
wherein the private.key is 2048 bits and is generated using an algorithmic function:
openssl genpkey—algorithm RSA—out private.key rsa_keygen_bits:2048.

* * * * *